US009277378B2

(12) United States Patent
Jackson et al.

(10) Patent No.: US 9,277,378 B2
(45) Date of Patent: Mar. 1, 2016

(54) SHORT MESSAGE SERVICE VALIDATION ENGINE

(71) Applicant: Verizon Patent and Licensing, Inc., Basking Ridge, NJ (US)

(72) Inventors: Jeffrey A. Jackson, Coppell, TX (US); Mark D. Carney, Sterling, VA (US); George G. Baumbach, Flower Mound, TX (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 246 days.

(21) Appl. No.: 13/723,966

(22) Filed: Dec. 21, 2012

(65) Prior Publication Data
US 2014/0179360 A1 Jun. 26, 2014

(51) Int. Cl.
G06F 11/00 (2006.01)
H04W 4/14 (2009.01)
H04W 12/12 (2009.01)
H04L 29/06 (2006.01)

(52) U.S. Cl.
CPC ............... *H04W 4/14* (2013.01); *H04W 12/12* (2013.01); *H04L 63/14* (2013.01); *H04L 63/1416* (2013.01)

(58) Field of Classification Search
CPC ................................................... H04W 12/12
USPC ............................ 726/22, 23, 24, 25; 713/188
See application file for complete search history.

(56) References Cited

U.S. PATENT DOCUMENTS

| 7,296,156 | B2 * | 11/2007 | Marmigere et al. | ........... 713/170 |
| 7,949,716 | B2 * | 5/2011 | Alperovitch et al. | ......... 709/206 |
| 7,953,814 | B1 * | 5/2011 | Chasin et al. | .................. 709/207 |
| 8,364,766 | B2 * | 1/2013 | Zheng et al. | ................... 709/206 |
| 8,387,141 | B1 * | 2/2013 | Zhukov et al. | ................... 726/22 |
| 8,578,480 | B2 * | 11/2013 | Judge et al. | ..................... 726/22 |
| 8,600,416 | B2 * | 12/2013 | Lin et al. | ........................ 455/466 |
| 2009/0325615 | A1 * | 12/2009 | McKay et al. | ................ 455/466 |

FOREIGN PATENT DOCUMENTS

CN 101472245 B * 8/2011
EP 1357764 A1 * 10/2003

OTHER PUBLICATIONS

Liang Xie, "pBMDS: A Behavior-based Malware Detection System for Cellphone Devices", pp. 37-48, ACM 2010.*

* cited by examiner

Primary Examiner — Samson Lemma

(57) ABSTRACT

A method, performed by a computer device, may include receiving a Short Message Service (SMS) message. The method may further include analyzing one or more sender parameters associated with the received SMS message to validate the one or more sender parameters; determining whether the one or more sender parameters have been validated based on the analysis; rejecting the SMS message in response to determining that the one or more sender parameters have not been validated; analyzing message content included in the SMS message to validate the message content; determining whether the message content has been validated based on the analysis; rejecting the SMS message in response to determining that the message content has not been validated; and forwarding the SMS message to a recipient, in response to validating the one or more sender parameters and in response to validating the message content.

18 Claims, 11 Drawing Sheets

SHORT MESSAGE SERVICE VALIDATION ENGINE

BACKGROUND INFORMATION

Mobile communication devices enable users to communicate using various methods. A popular communication method available to users of mobile communication devices is the Short Message Service (SMS). SMS enables a first user to send a short text message to a second user. The message sent using SMS, variously referred to as an SMS message, an SMS text message, or as a text message, may be limited to a particular number of characters, such as, for example, 160 7-bit characters. SMS may be used to exploit the vulnerabilities of a mobile communication device to perform malicious activity that is undesirable to the user, and/or the network, associated with the mobile communication device.

DETAILED DESCRIPTION OF PREFERRED EMBODIMENTS

Figure 1:
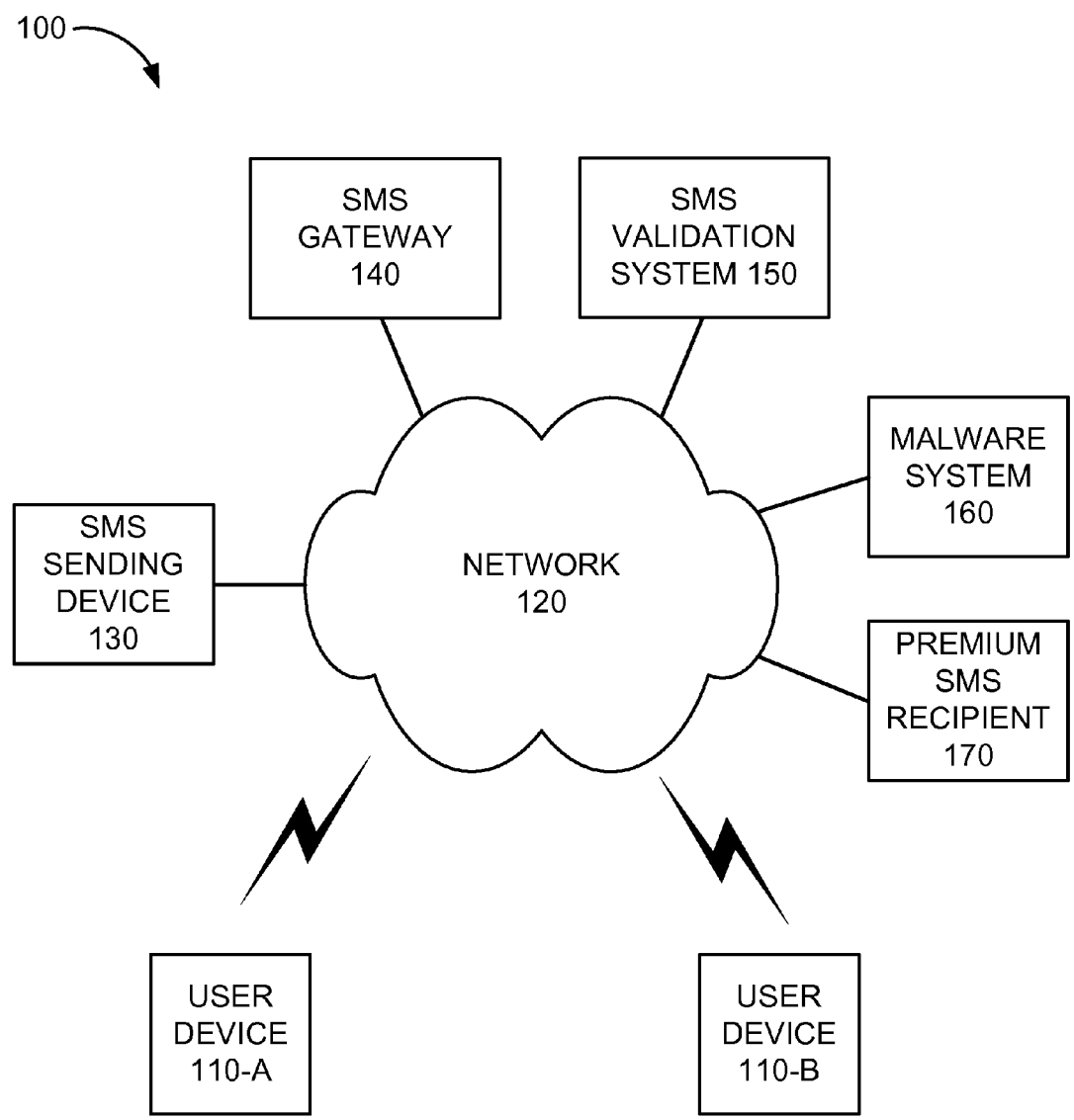
FIG. 1 is a diagram illustrating an exemplary environment according to an implementation described herein.

The following detailed description refers to the accompanying drawings. The same reference numbers in different drawings identify the same or similar elements.

Users of mobile communication devices may be targeted by cybercriminals using SMS messages to deliver phishing links and/or mobile malware. For example, a cybercriminal may cycle valid digit sequence combinations, such as Numbering Plan Area (NPA) and the first three digits of a phone number (NXX) combinations, to deliver SMS messages to valid mobile telephone numbers. A user may not be able to prevent receiving an unsolicited SMS message. Some unsolicited SMS messages may include spam. Other types of unsolicited SMS messages may be designed to appear to originate from a legitimate institution, such as a financial institution, a school, or a government entity, and may include a Uniform Resource Identifier (URI), such as a Uniform Resource Locator (URL) (also referred to herein as "links" or "hyperlinks"). The user may click on the URL and the mobile communication device may request content associated with the URL from a system designed to deliver malware to the mobile communication device. The malware may be delivered to the mobile communication device in response to the URL being clicked and may access sensitive data, may provide a backdoor for exploiting an operating system (OS) and/or an application running on the mobile communication device, may enable remote control of the mobile communication device, may send SMS messages to premium rate recipients without the user's permission, and/or may perform other types of malicious activity.

An implementation described herein relates to a Short Message Service (SMS) validation engine. The validation engine may reside in the network and may validate SMS messages based on one or more criteria. The validation engine may validate one or more sender parameters associated with an SMS message. The one or more sender parameters may include a mobile device identifier associated with the sender, such as an Electronic Serial Number (ESN), an International Mobile Equipment Identifier (IMEI), a Subscriber Identity Module (SIM) identifier, a Mobile Telephone Number (MTN), a Mobile Subscriber Integrated Services Digital Network number (MSISDN), an International Mobile Subscriber Identity amp number, a mobile identification number (MIN), an Integrated Circuit Card Identifier (ICCI), and/or any other mobile communication device identifier. Furthermore, the one or more sender parameters may include a base station identifier, a packet data network gateway identifier, a location associated with the mobile communication device, and/or one or more SMS gateway identifiers. The one or more sender parameters may be validated against values stored in a subscriber database. If the sender parameters are not validated, the SMS message may be rejected and may not be forwarded to the recipient.

The validation engine may further require that SMS gateways add a header to SMS messages. For example, an SMS message may be sent through a first provider (e.g., a small or local provider) via a first SMS gateway. The first provider may obtain connectivity through a second provider (e.g., a regional or national provider) using a second SMS gateway. Thus, the first SMS gateway may add a first header with a first identifier to an SMS message and the second SMS gateway may add a second header with a second identifier to the SMS message. If the SMS message is not validated and is therefore tagged for investigation of possible SMS spam or malware, the SMS gateway headers may be used to trace the path of the SMS message to determine where to focus the investigation. Furthermore, if, for example, the first SMS gateway is determined to be associated with malicious SMS messages, further SMS messages that include the first header may be rejected by the validation engine.

The validation engine may further validate message content of SMS messages. For example, the validation engine may maintain a blacklist and an SMS message that includes a sequence of characters included in the blacklist may be rejected. The blacklist may include, for example, sender identifiers, phrases, and/or URIs. Thus, if a URI has been determined to be associated with malware, SMS messages that include the URI may be rejected. Furthermore, a user may provide specifications that may be used to filter messages for which the user is a recipient. For example, a user may define a blacklist and/or a whitelist and SMS messages for which the user is a recipient may be validated against the user's blacklist and/or whitelist.

The validation engine may further perform behavior analysis on URIs included in an SMS message. For example, the validation engine may use the URI to download content to a virtual analysis space. The virtual analysis space may simulate particular operating systems, and/or particular applications, that may be running on a mobile communication device, and may analyze the behavior of the downloaded content with respect to a particular operating system. For example, the validation engine may perform signature checks for previously identified operating system exploits and/or application exploits. If the behavior analysis is not validated as a result of detecting suspicious behavior, the SMS message may be rejected and the URI may be added to a blacklist.

A mobile communication device may be infected with malware that may send SMS messages to a premium rate recipient, resulting in the user of the mobile communication device being charged premium rates for sending the SMS messages. A premium rate may correspond to a higher rate than a non-premium rate (e.g., standard) rate for sending or receiving SMS messages. The validation engine may detect SMS messages associated with a premium rate recipient and may alert the sender that a premium rate SMS message has been sent. For example, the validation engine may send an out-of-band message (e.g., an email message) to the sender. Furthermore, the sender may be provided with an option to disable the sending of premium rate SMS messages.

FIG. 1 is a diagram illustrating an exemplary environment 100 according to an implementation described herein. As shown in FIG. 1, environment 100 may include user device 110-A and user device 110-B (referred to herein collectively as "user devices 110" and individually as "user device 110"), network 120, SMS sending device 130, SMS gateway 140, SMS validation system 150, malware system 160, and premium SMS recipient 170. While two user devices 110, a single network 120, a single SMS sending device 130, a single SMS gateway 140, a single SMS validation system 150, a single malware system 160, and a single premium SMS recipient 170 are shown in FIG. 1 for illustrative purposes, in practice, environment 100 may include a different number of user devices 110, multiple networks 120, multiple SMS sending devices 130, multiple SMS gateways 140, multiple SMS validation systems 150, multiple malware systems 160, and/or multiple premium SMS recipients 170.

User device 110 may include any device capable of sending and/or receiving SMS messages. For example, user device 110 may include a mobile phone, a smart phone, a tablet computer, a laptop computer, a personal digital assistant (PDA), or another type of portable communication device. As another example, user device 110 may include a desktop computer, a set-top box, a telephone device with video capability, and/or another type of communication device. User device 110-A may send an SMS message to user device 110-B and/or may receive an SMS message from user device 110-B.

Network 120 may enable user devices 110, SMS sending device 130, SMS gateway 140, SMS validation system 150, malware system 160, and/or premium SMS recipient 170 to communicate with each other. Network 120 may include one or more wired and/or wireless networks. For example, network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network that may be used by user devices 110 to connect to network 120. Additionally, or alternatively, network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

SMS sending device 130 may include one or more devices, such as server devices, which enable a user to send an SMS message to user device 110. For example, SMS sending device 130 may correspond to a provider web site, or an SMS sending web site, which may enable a user to access a web page and to send an SMS message to user device 110 by typing in a phone number associated with user device 110 and by typing in the message content. As another example, a user may be able to send an SMS message using an email application and SMS sending device 130 may correspond to an email server. In some implementations, SMS sending device 130 may use Simple Mail Transfer Protocol (SMTP) and may convert SMTP messages to SMS messages and send the SMS messages to SMS gateway 140.

SMS gateway 140 may include one or more devices, such as server devices, which provide SMS services for user devices 110. For example, when user device 110 sends an SMS message, the SMS message may be sent to SMS gateway 140 and SMS gateway 140 may forward the SMS message to a provider network. An SMS message may be routed through multiple SMS gateways 140.

SMS validation system 150 may include one or more devices, such as server devices, which include a validation engine that validates SMS messages. The validation engine may validate one or more sender parameters associated with an SMS message, may validate message content of an SMS message, may perform behavior analysis on URIs included in an SMS message to determine whether the URI is associated with malicious content, may validate an SMS message against specifications provided by an intended recipient of the SMS message, and/or may perform other types of validations for an SMS message. Furthermore, SMS validation system 250 may monitor SMS messages for premium rate recipients and may alert a sender that a premium rate SMS message has been sent.

Malware system 160 may include one or more devices, such as server devices, which may provide malware to user device 110. For example, malware system 160 may send SMS messages through SMS gateway 140 (and/or via another device) to spoofed telephone numbers. The SMS messages may include a URI to malicious content stored in malware system 160. When a user of user device 110 clicks on a link, associated with the URI, the malicious content may be sent to user device 110. Additionally or alternatively, malware system 160 may infect user device 110 via another method, such as when user device 110 accesses a web page stored on malware system 160. The accessed web page may infect user device 110 with malware that, for example, causes user device 110 to send premium rate SMS messages to premium SMS recipient 170.

Premium SMS recipient 170 may include one or more devices, such as server devices, that are associated with premium rate SMS messages. For example, when premium SMS recipient 170 receives an SMS message, the sender of the SMS message may be charged a premium rate amount for sending the SMS message and an account associated with premium SMS recipient 170 may be credited with a portion of the charged amount.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
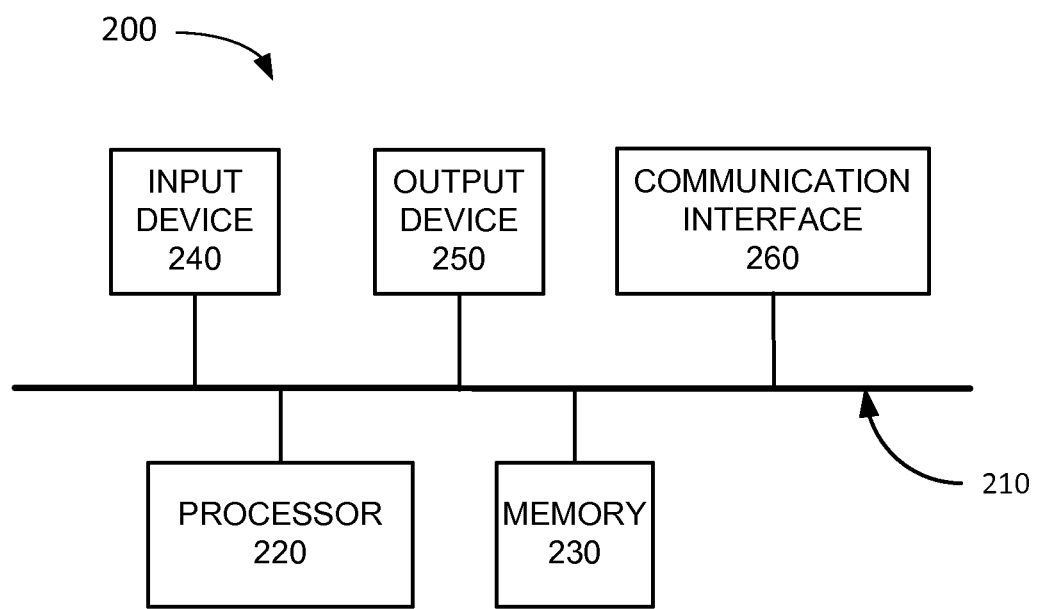
FIG. 2 is a diagram illustrating an exemplary implementation of the Short Message Service validation system of FIG. 1.

FIG. 2 is a diagram illustrating an exemplary device 200 that may be included in a component of the environment of FIG. 1 according to an implementation described herein. SMS validation system 150, SMS gateway 140, and/or SMS sending device 130 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to validation of SMS messages. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
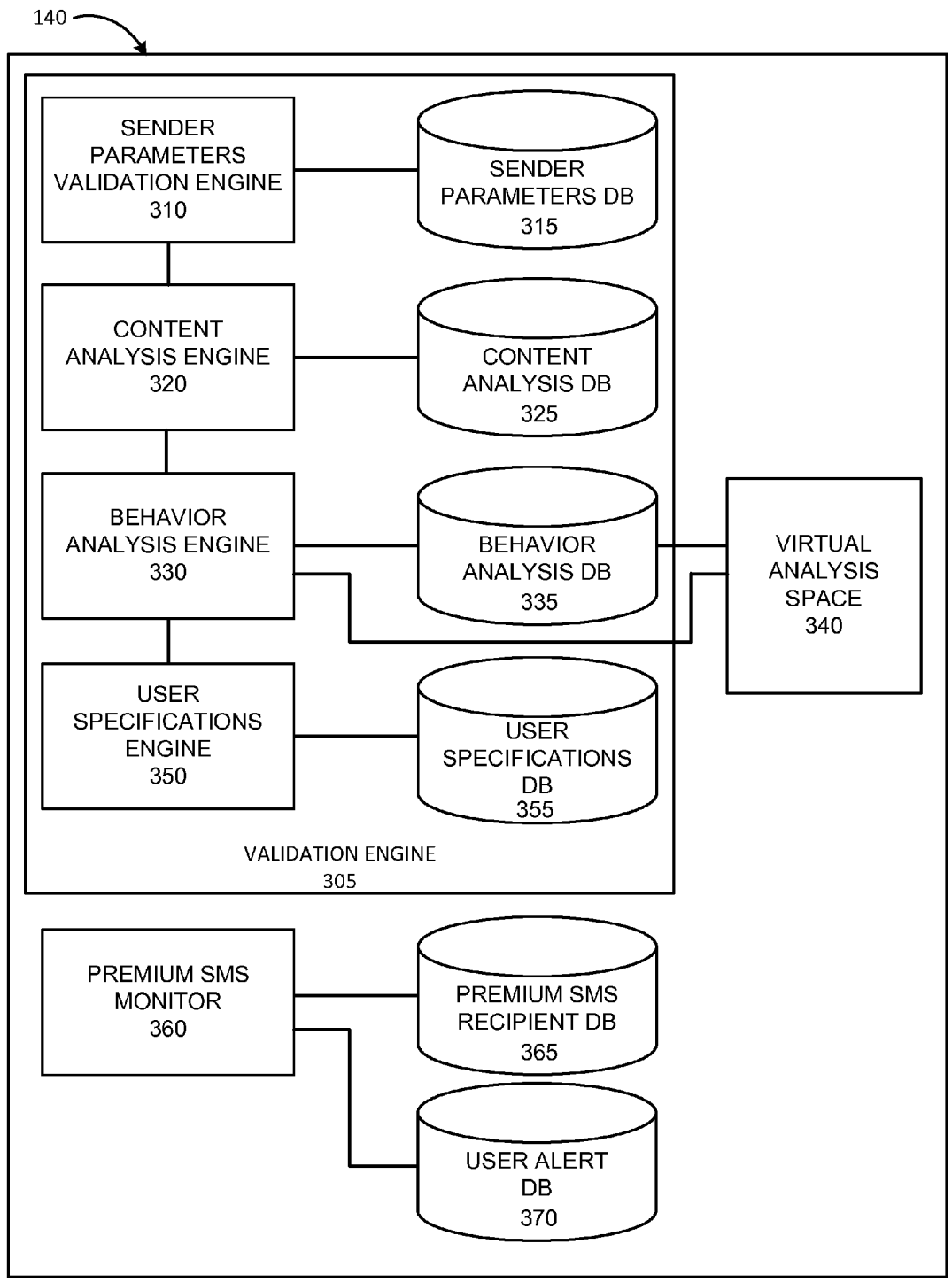
FIG. 3 is a diagram illustrating exemplary functional components of the Short Message Service validation system of FIG. 1.

FIG. 3 is a diagram illustrating exemplary functional components of SMS validation system 150 according to an implementation described herein. The functional components of SMS validation system 150 may be implemented, for example, via processor 220 executing instructions from memory 230. Alternatively, some or all of the functional components of SMS validation system 150 may be implemented via hard-wired circuitry. As shown in FIG. 3, SMS validation system 150 may include a validation engine 305, a virtual analysis space 340, a premium SMS monitor 360, a premium SMS recipient database (DB) 365, and a user alert DB 370.

Validation engine 305 may validate SMS messages based on one or more criteria. Validation engine 305 may include a sender parameters validation engine 310, a sender parameters DB 315, a content analysis engine 320, a content analysis DB 325, a behavior analysis engine 330, a behavior analysis DB 335, a user specifications engine 350, and a user specifications DB 355.

Sender parameters validation engine 310 may validate one or more sender parameters associated with an SMS message and may reject the SMS message if the one or more sender parameters are not validated. For example, sender parameters validation engine 310 may retrieve one or more sender parameters from an SMS message and compare the sender parameters to sender parameters stored in sender parameters DB 315. Exemplary information that may be stored in sender parameters DB 315 is described below with reference to FIG. 4.

Content analysis engine 320 may analyze message content associated with the SMS message to validate the message content and may reject the SMS message if the message content is not validated. For example, content analysis engine 320 may determine whether the message content includes a sequence of characters included in a blacklist stored in content analysis DB 325. Exemplary information that may be stored in sender parameters DB 315 is described below with reference to FIG. 4.

Behavior analysis engine 330 may perform behavior analysis on URIs included in an SMS message. For example, behavior analysis engine 330 may access content using a URI included in an SMS message and may download the content to virtual analysis space 340. Virtual analysis space 340 may simulate a particular mobile communication device operating system and/or may simulate a particular mobile communication device application. Behavior analysis engine 330 may analyze the behavior of the downloaded content with respect to the particular operating system and/or with respect to the particular application, and may compare the analyzed behavior to behavior patterns stored in behavior analysis DB 335. Exemplary information that may be stored in behavior analysis DB 335 is described below with reference to FIG. 4.

Premium SMS monitor 360 may monitor SMS messages for premium rate SMS recipients by comparing an intended recipient of the SMS message with premium rate recipients stored in premium SMS recipient DB 365. Premium SMS recipient DB 365 may store information identifying premium rate SMS recipients. When premium SMS monitor 360 detects a premium rate SMS recipient, premium SMS monitor 360 may send an alert to the sender of the SMS message using information stored in user alert DB 370. User alert DB 370 may store contact information that may be used to send an out-of-band message to the sender. An out-of-band message may correspond to a message sent using a method different from an SMS message, such as an email message, a voicemail, an automated telephone call, etc. If a user does not specify an out-of-band method, an SMS message may be sent back to the user to alert the user that a premium rate SMS message has been sent. The alert may include a request to provide an out-of-band contact address, such as an email address, for receiving further alerts relating to the sending of premium rate SMS messages.

Furthermore, user alerts DB 370 may store user preferences with respect to premium rate SMS messages. For example, a user may select to block the sending of premium rate SMS message or may only allow the sending of premium rate SMS messages to a specified whitelist of premium rate SMS recipients.

Although FIG. 3 shows exemplary functional components of SMS validation system 150, in other implementations, SMS validation system 150 may include fewer functional components, different functional components, differently arranged functional components, or additional functional components than depicted in FIG. 3. Additionally or alternatively, one or more functional components of SMS validation system 150 may perform functions described as being performed by one or more other functional components of SMS validation system 150.

Figure 4:
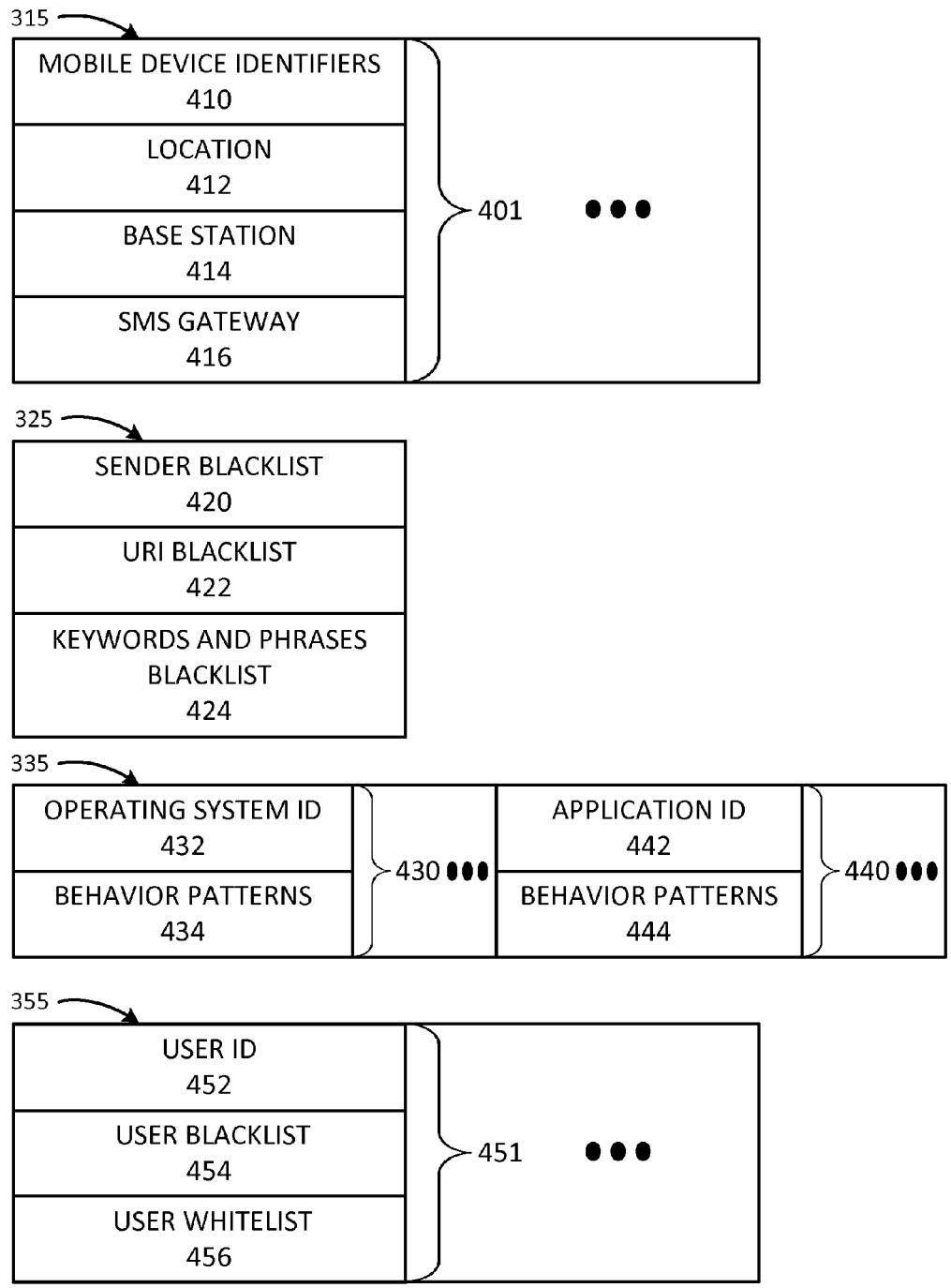
FIG. 4 is a diagram illustrating exemplary components of databases that may be included in the validation engine of the Short Message Service validation system of FIG. 1.

FIG. 4 is a diagram illustrating exemplary components of databases that may be included in the validation engine of the Short Message Service validation system of FIG. 1.

Sender parameters DB 315 may store information relating to sender parameters associated with a sender of an SMS message. The information in sender parameters DB 315 may be obtained from a subscriber database. For example, information from the subscriber database may be mirrored to sender parameters DB 315 at particular intervals. Sender parameters DB 315 may include one or more sender records 401 (referred to herein collectively as "sender records 401" and individually as "sender record 401"). Each sender record 401 may store sender parameters associated with a particular sender. The particular sender may be identified by a particular mobile device identifier, such as an MTN. Sender record 401 may include a mobile device IDs field 410, a location field 412, a base station field 414, and an SMS gateway field 416.

Mobile device IDs field 410 may store one or more mobile device IDs associated with the particular sender. For example, mobile device IDs field 410 may store an ESN, an IMEI, a SIM ID, an MTN, an MSISDN, an IMSI, an MIN, an ICCI, and/or another type of mobile device identifier associated with the particular sender.

Location field 412 may store a current location associated with the particular sender. For example, location field 412 may store a set of coordinates, such as Global Positioning System (GPS) coordinates, may store information identifying a particular geographic region, and/or may store another type of location information. Base station field 414 may store information identifying a current base station associated with the particular sender, such as a base station ID. Base station field 414 may store additional identifiers associated with a wireless access network, such as, for example, a packet data network gateway identifier. SMS gateway field 416 may store information identifying one or more SMS gateways associated with the particular sender, such as an SMS gateway name and a corresponding SMS gateway ID code.

Content analysis DB 325 may store information identifying content that has been determined to be associated with malware. Information may be added to content analysis DB 325 in response to determining that particular content has been identified as being associated with malware. Content may be identified as being associated with malware based on an investigation triggered by suspicious activity, based on an analysis performed by validation engine 305, and/or based on the result of another detection of malware.

Content analysis DB may include a sender blacklist field 420, a URI blacklist field 422, and a keywords and phrases blacklist field 424. Sender blacklist field 420 may include information identifying senders that have been associated with malware. For example, sender blacklist field 420 may include ESNs, IMEIs, SIM IDs, MTNs, MSISDNs, IMSIs, MINs, ICCIs, and/or other types of mobile device identifiers that have been identified as being associated with malware. URI blacklist field 422 may store URIs, and/or URI shorteners, which have been identified as being associated with malware. Keywords and phrases blacklist field 424 may store keywords and/or phrases that have been identified as being associated with malware. For example, keywords and/or phrases identified as being associated with unsolicited advertisements may be added to keywords and phrases blacklist field 424.

Behavior analysis DB 335 may store information relating to behavior patterns that have been identified as being associated with malware. Behavior analysis DB 335 may include one or more operating system records 430 (referred to herein collectively as "operating system records 430" and individually as "operating system record 430") and one or more application records 440 (referred to herein collectively as "application records 440" and individually as "application record 440").

Operating system record 430 may store information relating to a particular operating system. Operating system record 430 may include an operating system ID field 432 and a behavior patterns field 434. Operating system ID field 432 may include information identifying a particular operating system, such as an operating system name, an operating system version, an operating system update, and/or other information that may identify a particular operating system. Behavior patterns field 434 may store information identifying particular behavior patterns, associated with the particular operating system, which have been identified as being associated with malware. For example, behavior patterns field 434 may store a signature associated with exploiting a known vulnerability of the operating system, a signature indicative of tampering with the kernel of the operating system, a signature indicative of tampering with the operating system services, and/or another type of signature.

Application record 440 may store information relating to a particular application. Application record 430 may include an application ID field 442 and a behavior patterns field 444. Application ID field 442 may include information identifying a particular application, such as an application name, an application version, an application update, and/or other information that may identify a particular application. Behavior patterns field 444 may store information identifying particular behavior patterns, associated with the particular application, which have been identified as being associated with malware. For example, behavior patterns field 444 may store a signature associated with exploiting a known vulnerability of the application, a signature indicative of causing a buffer overflow, a signature associated with a hardcoded password, and/or another type of signature.

User specifications DB 355 may store information relating to specifications associated with a particular user. User specifications DB 355 may include one or more user records 451 (referred to herein collectively as "user records 451" and individually as "user record 451"). Each user record 451 may store information relating to specifications associated with a particular user. User record 451 may include a user ID field 452, a user blacklist field 454, and a user whitelist field 456.

User ID field 452 may store information identifying a particular user. For example, user ID field 452 may store a mobile device identifier associated with the particular user, such as an ESN, an IMEI, a SIM ID, an MTN, an MSISDN, an IMSI, an MIN, an ICCI, and/or another type of mobile device identifier. Blacklist field 454 may store a blacklist associated with the particular user. For example, the user may select to block SMS messages from a particular sender, may select to block SMS messages that include a particular keyword or phrase, may select to block SMS messages that include URIs, and/or may select to block SMS messages associated with another type of content. Whitelist field 456 may store a whitelist associated with the particular user. The user may select to only accept SMS messages if they match items on the whitelist. For example, the user may select to receive SMS messages only from particular senders.

Although FIG. 4 shows exemplary components sender parameters DB 315, content analysis DB 325, behavior analysis DB 335, and user specifications DB 355, in other implementations, sender parameters DB 315, content analysis DB 325, behavior analysis DB 335, and/or user specifications DB 355 may include fewer components, different components, differently arranged components, or additional components than depicted in FIG. 4.

Figure 5:
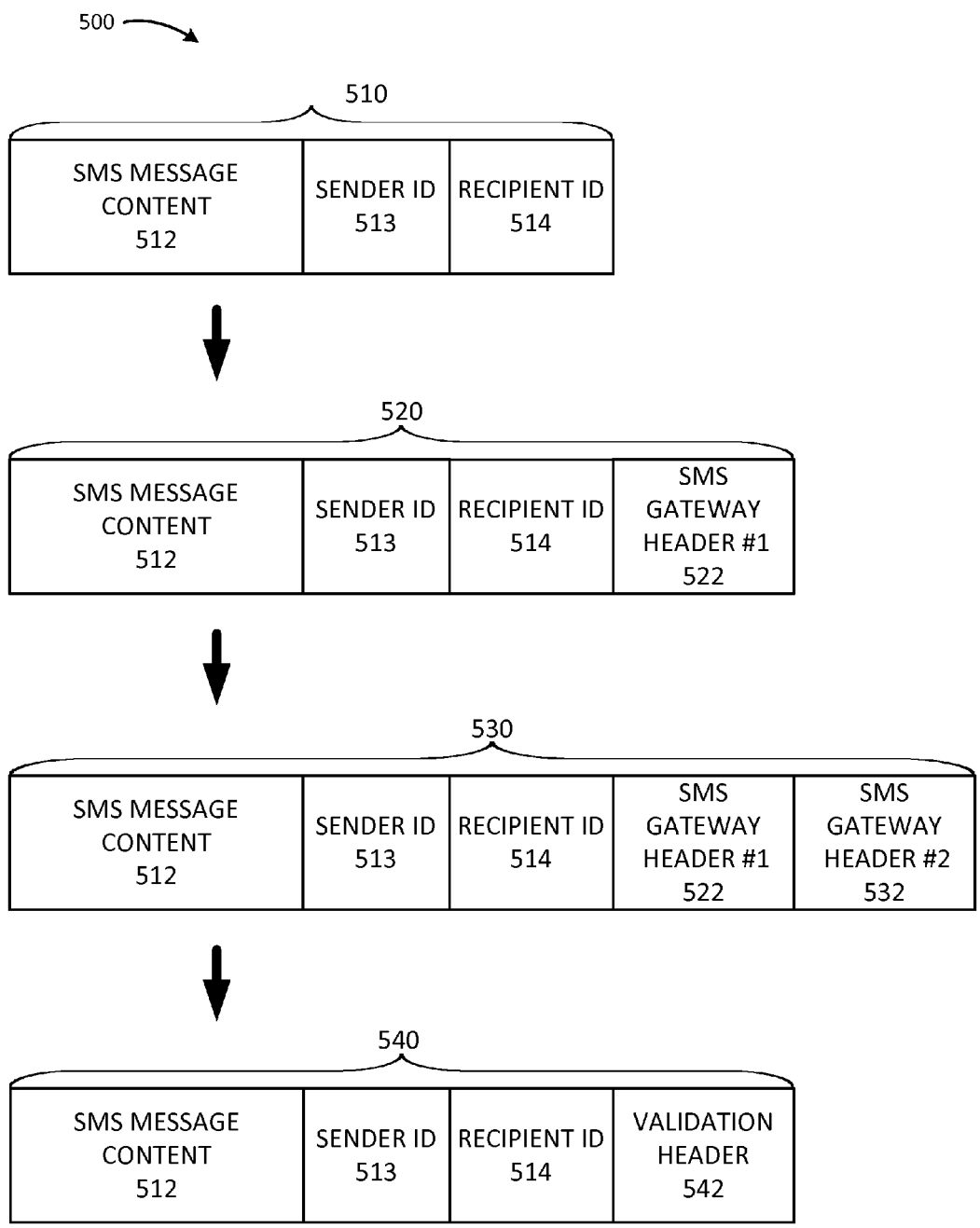
FIG. 5 is a diagram illustrating an exemplary sequence that shows exemplary components of a Short Message Service message exchanged by the components of FIG. 1 according to an implementation described herein.

FIG. 5 is a diagram illustrating an exemplary sequence 500 that shows exemplary components of a Short Message Service message exchanged by the components of environment 100. As shown in FIG. 5, sequence 500 may include a first SMS message format 510, a second SMS message format 520, a third SMS message format 530, and a fourth SMS message format 540.

First SMS message format 510 may correspond to the format of an SMS message sent from user device 110 to SMS gateway 140. First SMS message format 510 may include an SMS message content field 512, a sender identifier (ID) field 513, and a recipient ID field 514. SMS message content field 512 may include the message content, such as up to 160 7-bit characters. Sender ID field 513 may store one or more sender parameters, such as the sender's ESN, IMEI, SIM ID, MTN, MSISDN, IMSI, MIN, ICCI, and/or another type of mobile device identifier. Furthermore, sender ID field 513 may include a base station identifier of a base station associated with user device 110. Recipient ID field 514 may store information identifying an intended recipient of the SMS message, such as a mobile device identifier of the intended recipient (e.g., MTN, MSISDN, IMSI, MIN, etc.).

When a first SMS gateway 140 receives the SMS message, the first SMS gateway 140 may change the format of the SMS message to second SMS message format 520. Second SMS message format 520 may include SMS message content field 512, sender ID field 513, recipient ID field 514, and an SMS gateway header #1 522. SMS gateway header #1 522 may include an identifier associated with the first SMS gateway 140 (e.g., a name) and/or an identification code associated with the first SMS gateway 140. The first SMS gateway 140 may send the SMS message to a second SMS gateway 140.

When the second SMS gateway 140 receives the SMS message, the second SMS gateway 140 may change the format of the SMS message to third SMS message format 530. Third SMS message format 530 may include SMS message content field 512, sender ID field 513, recipient ID field 514, SMS gateway header #1 522, and an SMS gateway header #2 532. SMS gateway header #2 532 may include an identifier associated with the second SMS gateway 140 (e.g., a name) and/or an identification code associated with the second SMS gateway 140. The second SMS gateway 140 may send the SMS message to SMS validation system 150.

When SMS validation system 150 receives the SMS message, SMS validation system 150 may change the format of the SMS message to fourth SMS message format 540. Fourth SMS message format 540 may include SMS message content field 512, sender ID field 513, recipient ID field 514, and a validation header 542. Thus, SMS validation system 150 may remove SMS gateway header #1 522 and SMS gateway header #2 532, and may add validation header 542. Validation header 542 may include information that may facilitate a follow up investigation of the SMS message. For example, validation header 542 may include a hash of the information from SMS gateway header #1 522 and SMS gateway header #2 532.

In other implementations, SMS validation system 150 may remove SMS gateway header #1 522 and an SMS gateway header #2 532, and may not add validation header 542. In yet other implementations, SMS validation system 150 may not remove SMS gateway header #1 522 and SMS gateway header #2 532, and may not add validation header 542.

Although FIG. 5 shows exemplary components of an SMS message during sequence 500, in other implementations, an SMS message during sequence 500 may include fewer components, different components, differently arranged components, or additional components than depicted in FIG. 5. For example, an SMS message may pass through only one SMS gateway 140 or may pass through more than two SMS gateways 140. Each SMS gateway 140 may add a header to the SMS message.

Figure 6:
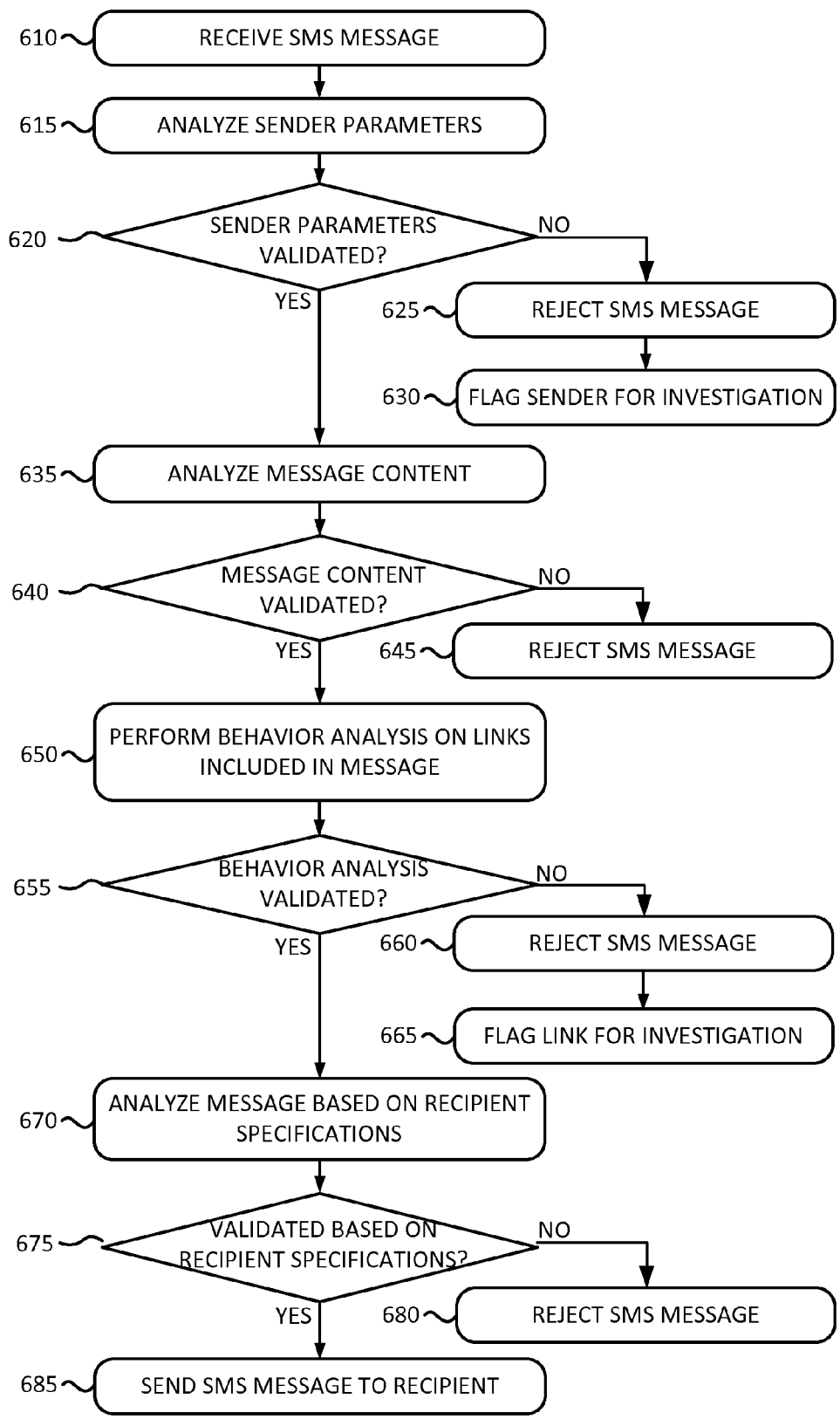
FIG. 6 is a flowchart of an exemplary process for validating a Short Message Service message according to an implementation described herein.

FIG. 6 is a flowchart of an exemplary process for validating a Short Message Service message according to an implementation described herein. In one implementation, the process of FIG. 6 may be performed by SMS validation system 150. In other implementations, some or all of the process of FIG. 6 may be performed by another device or a group of devices separate from SMS validation system 150 and/or including SMS validation system 150.

The process of FIG. 6 may include receiving an SMS message (block 610). For example, SMS validation system 150 may receive an SMS message via SMS gateway 140. The SMS message may have originated from user device 110, from SMS sending device 130, or from malware system 160.

Sender parameters, associated with the received SMS message, may be analyzed (block 615). For example, sender parameters validation engine 310 may retrieve one or more sender identifiers from sender ID field 513 of the received SMS message and may compare the retrieved one or more sender identifiers to information stored in sender parameters DB 315. Sender parameters validation engine 310 may use a first sender parameter, included in the received SMS message, to identify a sender record 401 in sender parameters DB 315 and may determine whether a second sender parameter (and/or additional sender parameters), included in the received SMS message, matches a corresponding sender parameter (and/or the additional sender parameters) in the identified sender record 401. If the sender parameters included in the received SMS message match the sender parameters in the identified sender record 401, the sender parameters may be validated. For example, malware system 160 may generate an SMS message that includes a false sender identifier, such as a spoofed MTN. Malware system 160 may not be able to determine additional sender parameters associated with the spoofed MTN, such as a SIM ID or a base station identifier, since malware system 160 may not have access to a subscriber database. Thus, the sender parameters generated by malware system 160 may not match the sender parameters obtained from a subscriber database and stored in sender parameters DB 315 by SMS validation system 150.

As an example, sender ID field 513 may include an MTN associated with user device 110 and a base station identifier associated with user device 110. Sender parameters validation engine 310 may identify a sender record 401 in sender parameters DB 315 that matches the MTN included in sender ID field 513 of the received SMS message. Sender parameters validation engine 310 may then determine whether a base station identifier stored in base station field 414 of the identified sender record 401 matches the base station identifier included in the received SMS message. If the base station identifier included in the SMS message matches the base station identifier in the identified sender record 401, the sender parameters may be validated.

As another example, sender ID field 513 of the received SMS message may include an IMSI and an MSISDN, and SMS gateway header #1 field 522 of the received SMS message may include an SMS gateway identifier. Sender parameters validation engine 310 may identify a sender record 401 in sender parameters DB 315 that matches the IMSI included in sender ID field 513 of the received SMS message. Sender parameters validation engine 310 may then determine whether an MSISDN stored in mobile device identifiers field 410 of the identified sender record 401 matches the MSISDN included in the received SMS message and may determine whether an SMS gateway identifier stored in SMS gateway field 416 of the identified sender record 401 matches the SMS gateway identifier included in the received SMS message. If the MSISDN included in the received SMS message matches the MSISDN in the identified sender record 401, and if the SMS gateway identifier included in the received SMS message matches the SMS gateway identifier in the identified sender record 401, the sender parameters may be validated.

In some implementations, SMS validation system 150 may analyze sender parameters included in SMS messages without establishing particular requirements for information that should be included in sender ID field 513 of SMS messages that are to be validated. In other implementations, SMS validation system 150 may require that particular information be included in sender ID field 513 and may instruct SMS gateway 140, user device 110, or another device (e.g., a base station) to add particular sender information to sender ID field 513. SMS messages that do not include the required sender information may not be validated by SMS validation system 150 and may be rejected.

A determination may be made as to whether the sender parameters have been validated (block 620). If the sender parameters have not been validated (block 620—NO), the SMS message may be rejected (block 625) and the sender may be flagged for investigation (block 630). For example, SMS validation system 150 may not forward the received SMS message to the intended recipient and may flag the SMS message for investigation. For example, an administrator may follow up to determine whether other SMS messages associated with a particular sender, and/or a particular SMS gateway, have been flagged for investigation, and/or may manually examine the content of the SMS message to determine whether the SMS message is to be identified as malicious.

If the sender parameters have been validated (block 620—YES), the message content may be analyzed (block 635). For example, content analysis engine 320 may analyze the message content included in the SMS message content field 512 of the received SMS message, and/or sender information stored in sender ID field 513 of the received SMS message, and may compare the message content, and/or the sender information, to information stored in content analysis DB 325. As an example, content analysis engine 320 may determine whether the message content includes content that matches keyword or phrases stored in keywords and phrases blacklist 424 of content analysis DB 325. As another example, content analysis engine 320 may determine whether a URI included in the message content matches a URI stored in URI blacklist 422 of content analysis DB 325. As yet another example, content analysis engine 320 may determine whether at least some of the sender information included in the received SMS message matches sender information stored in sender blacklist 420 of content analysis DB 325. If the message content or the sender information matches any information stored in content analysis DB 325, the message content may not be validated.

A determination may be made as to whether the message content has been validated (block 640). If the message content has not been validated (block 640—NO), the SMS message may be rejected (block 645). For example, SMS validation system 150 may not forward the received SMS message to the intended recipient. If the message content has been validated (block 640—YES), behavior analysis may be performed on a link included in the message (block 650). For example, behavior analysis engine 330 may determine whether any links (i.e., URIs) are included in the received SMS message. If no links are included in the received SMS message, behavior analysis may be validated. If one or more links are included in the received SMS message, behavior analysis may need to be validated with respect to each of the included links. A link may be used to access content referenced by the link and the content may be downloaded to virtual analysis space 340. Virtual analysis space 340 may include a simulation of operating systems and/or applications. For example, virtual analysis space 340 may include multiple virtual mobile communication devices, with each virtual mobile communication device running a particular operating system (e.g., iOS, Android, bada, Symbian OS, Windows Phone, etc.). Furthermore, particular application may also be simulated for particular operating systems (e.g., a browser application, an email application, a video streaming application, a social media application, etc.). The behavior of the downloaded content may be analyzed with respect to behavioral signature patterns stored in behavior analysis DB 335. If suspicious behavior is detected with respect to the downloaded content, behavior analysis may not be validated for the received SMS message.

A determination may be made as to whether the behavior analysis has been validated (block 655). If the behavior analysis has not been validated (block 655—NO), the SMS message may be rejected (block 660) and the link may be flagged for investigation (block 665). For example, SMS validation system 150 may not forward the received SMS message to the intended recipient and may flag the SMS message for investigation. For example, an administrator may follow up to determine whether the downloaded content should be identified as malware. If the downloaded content is identified as malware, the URI used to download the content may be added to content analysis DB 325.

If the link has been validated (block 655—YES), the message may be analyzed based on recipient specifications (block 670). For example, user specifications engine 350 may identify an intended recipient of the received SMS message, based on information stored in recipient ID field 514 of the received SMS message. User specifications engine 350 may then access user specifications DB 355 to determine whether the identified recipient is associated with a user record 451 in user specifications DB 355. If the identified recipient is associated with a user record 451, user specifications engine 350 may determine whether the message content, and/or the sender information, included in the SMS message matches information in the identified user record 451. If at least some of the message content or the sender information matches information stored in user blacklist field 454 of the identified user record 451, the SMS message may not be validated based on the user specifications. If the message content or the sender information does not match information stored in user whitelist field 456 of the identified user record 451, the SMS message may not be validated based on the user specifications.

A determination may be made as to whether to validate the SMS message based on the recipient specifications (block 675). If the SMS message is not validated based on the recipient specifications (block 675—NO), the SMS message may be rejected (block 680). For example, SMS validation system 150 may not forward the received SMS message to the intended recipient. If the SMS message is validated based on the recipient specifications (block 675—YES), the SMS message may be sent to the recipient (block 685). For example, SMS validation system 150 may forward the received SMS message to the recipient identified in recipient ID field 514 of the received SMS message.

Figure 7:
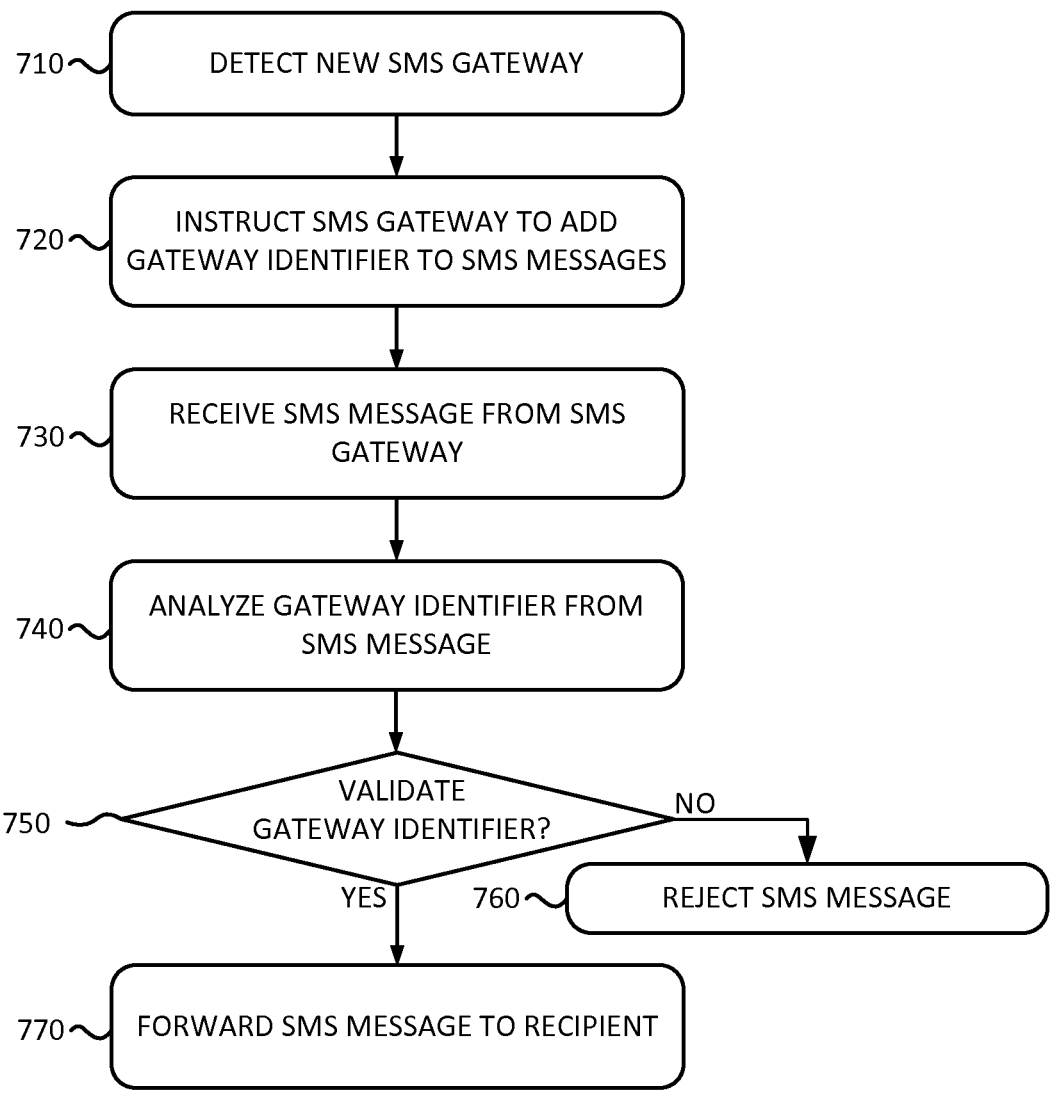
FIG. 7 is a flowchart of an exemplary process for validating a Short Message Service gateway according to an implementation described herein.

FIG. 7 is a flowchart of an exemplary process for validating a Short Message Service gateway according to an implementation described herein. In one implementation, the process of FIG. 7 may be performed by SMS validation system 150. In other implementations, some or all of the process of FIG. 7 may be performed by another device or a group of devices separate from SMS validation system 150 and/or including SMS validation system 150.

The process of FIG. 7 may include detecting a new SMS gateway (block 710). As an example, a provider of an SMS may advertise a new SMS gateway to SMS validation system 150. As another example, SMS validation system 150 may receive an SMS message without an SMS gateway header and may determine that the SMS message has not been received from any identified SMS gateway 140.

The SMS gateway may be instructed to add a gateway identifier to SMS messages (block 720). For example, SMS validation system 150 may assign an SMS gateway identifier to the new SMS gateway and may instruct the new SMS gateway to include the SMS gateway identifier in SMS messages routed through the SMS gateway.

An SMS message may be received from the SMS gateway and a gateway identifier from the SMS message may be analyzed (block 730). For example, SMS validation system 150 may determine whether the SMS message includes an SMS gateway header. If the SMS message does not include an SMS gateway header, a gateway identifier may not be validated for the SMS message. If the SMS message includes an SMS header, the SMS gateway header may be analyzed to determine whether the SMS header includes a gateway identifier that matches a stored gateway identifier. For example, the SMS gateway header may include information identifying a particular SMS gateway (e.g., an SMS gateway name, an IP address associated with an SMS gateway, etc.) and an SMS gateway identifier. SMS validation system 150 may determine whether the SMS gateway identifier included in the SMS gateway header matches the SMS gateway identifier assigned to the particular SMS gateway. If the SMS gateway identifier, included in the SMS gateway header of the received SMS message, matches the SMS gateway identifier assigned to the particular SMS gateway, the SMS gateway identifier may be validated.

A determination may be made as to whether the SMS gateway identifier has been validated (block 750). If the gateway identifier is not validated (block 750—NO), the SMS message may be rejected (block 760). For example, SMS validation system 150 may not forward the received SMS message to the intended recipient of the SMS message. If the gateway identifier is validated (block 750—YES), the SMS message may be forwarded to a recipient (block 770). For example, SMS validation system 150 may forward the received SMS message to the recipient identified in recipient ID field 514 of the received SMS message.

SMS validation system 150 may also establish particular requirements with respect to SMS sending device 130. For example, SMS validation system 150 may require that SMS sending device 130 perform a blacklist check before translating a message, created by a user, to an SMS message. For example, SMS validation engine 150 may provide a blacklist from content analysis DB 325 to SMS sending device 130. As another example, SMS validation system 150 may require that SMS sending device 130 include particular information in sender ID field 513 of an SMS message sent from SMS sending device 130. For example, SMS sending device 130 may extract an IP address for an initial message source and/or for transit Mail Transfer Agents for an email message received by SMS sending device 130. The extracted IP addresses may be included in sender ID field 513 of an SMS message generated by SMS sending device 130 from the email message and may be used for tracking a source of an SMS message that is identified by SMS validation system 150 as being associated with malware.

Figure 8:
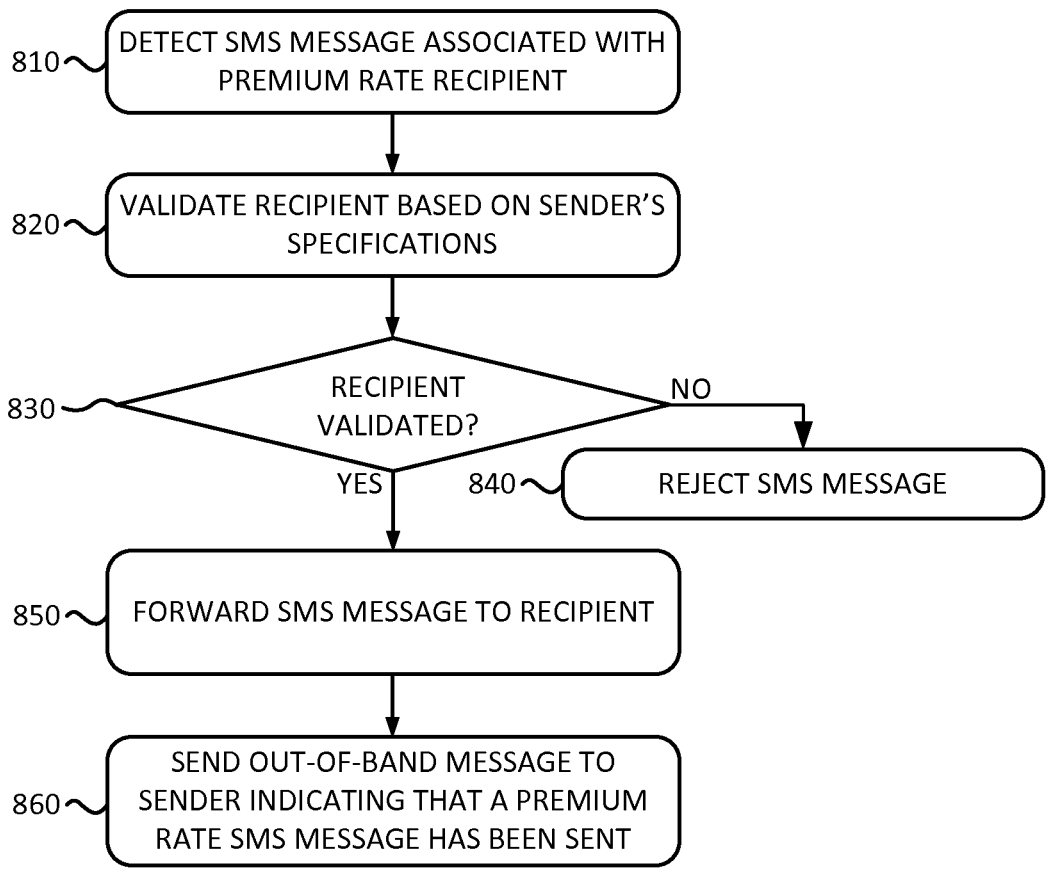
FIG. 8 is a flowchart of an exemplary process for monitoring premium Short Message Service messages according to an implementation described herein.

FIG. 8 is a flowchart of an exemplary process for monitoring premium Short Message Service messages according to an implementation described herein. In one implementation, the process of FIG. 8 may be performed by SMS validation system 150. In other implementations, some or all of the process of FIG. 8 may be performed by another device or a group of devices separate from SMS validation system 150 and/or including SMS validation system 150.

The process of FIG. 8 may include detecting an SMS message associated with a premium rate recipient (block 810). For example, SMS validation system 150 may receive an SMS message and premium SMS monitor 360 may access premium SMS recipient DB 365 to determine whether the recipient of the SMS message is a premium rate recipient.

The recipient may be validated based on the sender's specifications (block 820). For example, premium SMS monitor 360 may access user alerts DB 370 to determine whether the sender of the SMS message allows SMS messages to be sent to premium rate recipients and/or whether the particular premium rate SMS recipient is on a blacklist or on a whitelist associated with the sender of the SMS message. If the sender allows SMS messages to be sent to premium rate SMS recipients, and if the premium rate SMS recipient is either not on a blacklist or is listed on a whitelist associated with the sender, the premium recipient may be validated.

A determination may be made as to whether the recipient has been validated (block 830). If the recipient has not been validated (block 830—NO), the SMS message may be rejected (block 840). For example, SMS validation system 150 may not forward the SMS message to the premium rate SMS recipient. If the recipient has been validated (block 830—YES), the SMS message may be sent to the premium rate recipient (block 850) and an out-of-band message may be sent to the sender, indicating that a premium rate SMS message has been sent (block 860). For example, premium SMS monitor 360 may access user alerts DB 370 to determine an email address associated with the sender and may send an email message to the email address, alerting the sender that a premium rate SMS message has been sent from the sender's user device 110.

Figure 9:
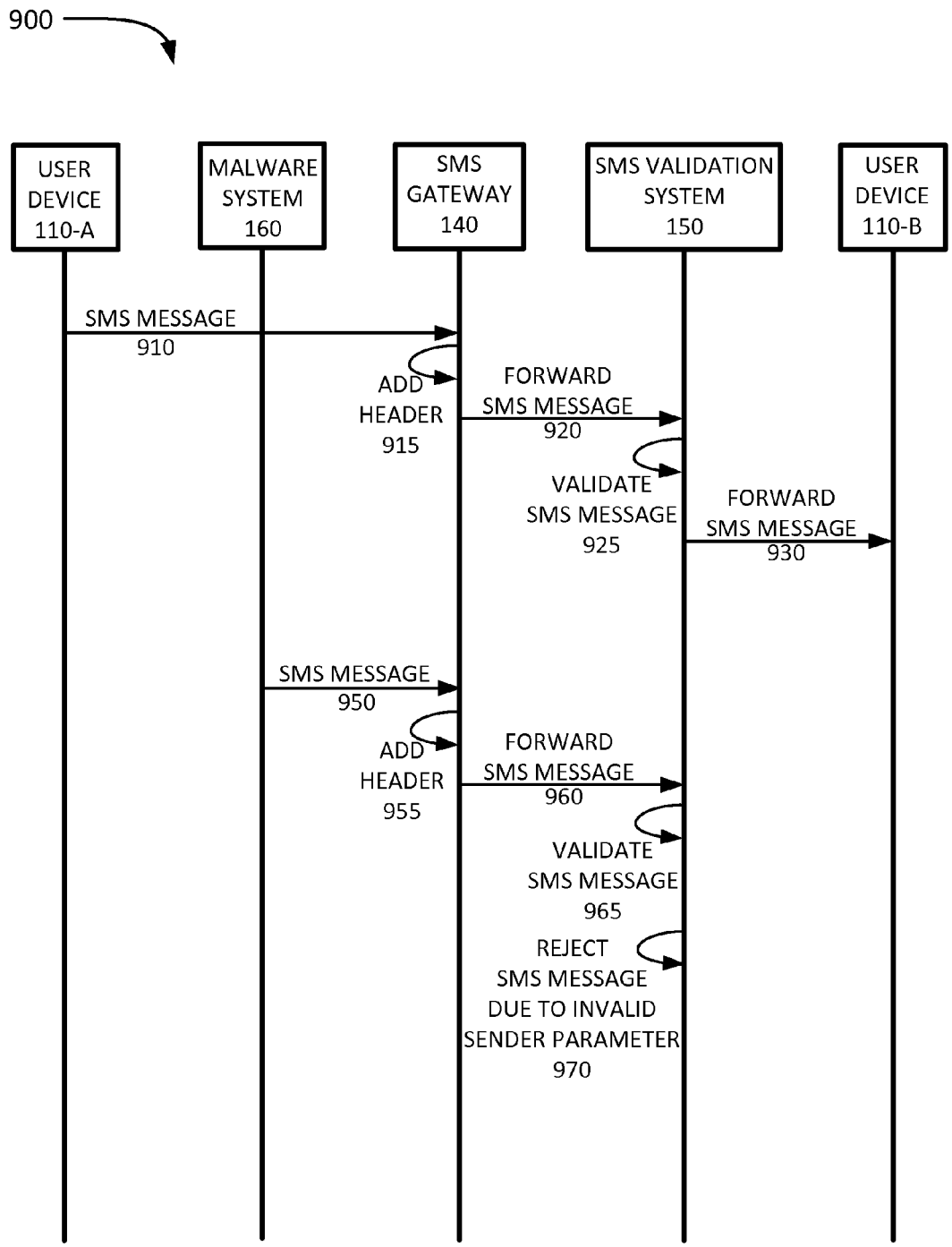
FIG. 9 is a first exemplary signal flow for sending a Short Message Service message according to an implementation described herein.

FIG. 9 is a first exemplary signal flow 900 for sending a Short Message Service message according to an implementation described herein. Signal flow 900 includes an example of an SMS message being rejected as a result of sender parameters not being validated. Signal flow 900 may include user device 110-A sending an SMS message to user device 110-B. User device 110-A may send the SMS message to SMS gateway 140 (signal 910). SMS gateway 140 may add an SMS gateway header to the SMS message (signal 915) and may forward the SMS message to SMS validation system 150 (signal 920). SMS validation system 150 may validate the sender parameters of the SMS message, may validate the content of the SMS message, and may validate the SMS message with respect to the user specifications associated with the user of user device 110-B. Assuming no URIs are included in the message, SMS validation system 150 may not need to perform any behavior analysis. Assuming the sender parameters and the message content are validated and assuming the user of user device 110-B has specified a whitelist that includes user device 110-A (e.g., based on an IMSI associated with user device 110-A), the SMS message may be forwarded to user device 110-B (signal 930).

Assume that malware system 160 has spoofed an IMSI associated with user device 110-B and sends an unsolicited SMS message to user device 110-B via SMS gateway 140 (signal 950). SMS gateway 140 may add an SMS gateway header to the SMS message (signal 955) and may forward the SMS message to SMS validation system 150 (signal 960). SMS validation system 150 may attempt to validate the sender parameters associated with the received SMS message. Assume sender ID field 513 of the SMS message includes an IMSI and an IP address of a packet data network gateway through which the SMS message was sent. Malware system 160 may use a spoofed IMSI as a sender identifier and may send the SMS message through a packet data network gateway that may add an IP address of the packet data network gateway to sender ID field 513 of the SMS message.

SMS validation system 150 may attempt to validate the sender parameters of the SMS message by identifying a sender record 401 that is associated with the IMSI included in the received SMS message. SMS validation system 150 may then determine whether the IP address of the packet data network gateway, included in sender ID field 513 of the SMS message, matches an IP address of a packet data network gateway of the identified sender record 401. Since the SMS message was not sent from a user device 110 associated with the IMSI, but was generated by malware system 160, the IP address of the packet data network gateway included in sender ID field 513 will not match the IP address in the identified sender record 401. As a result, SMS validation system 150 may not validate the sender parameters of the received SMS message and may reject the SMS message (signal 970).

Figure 10:
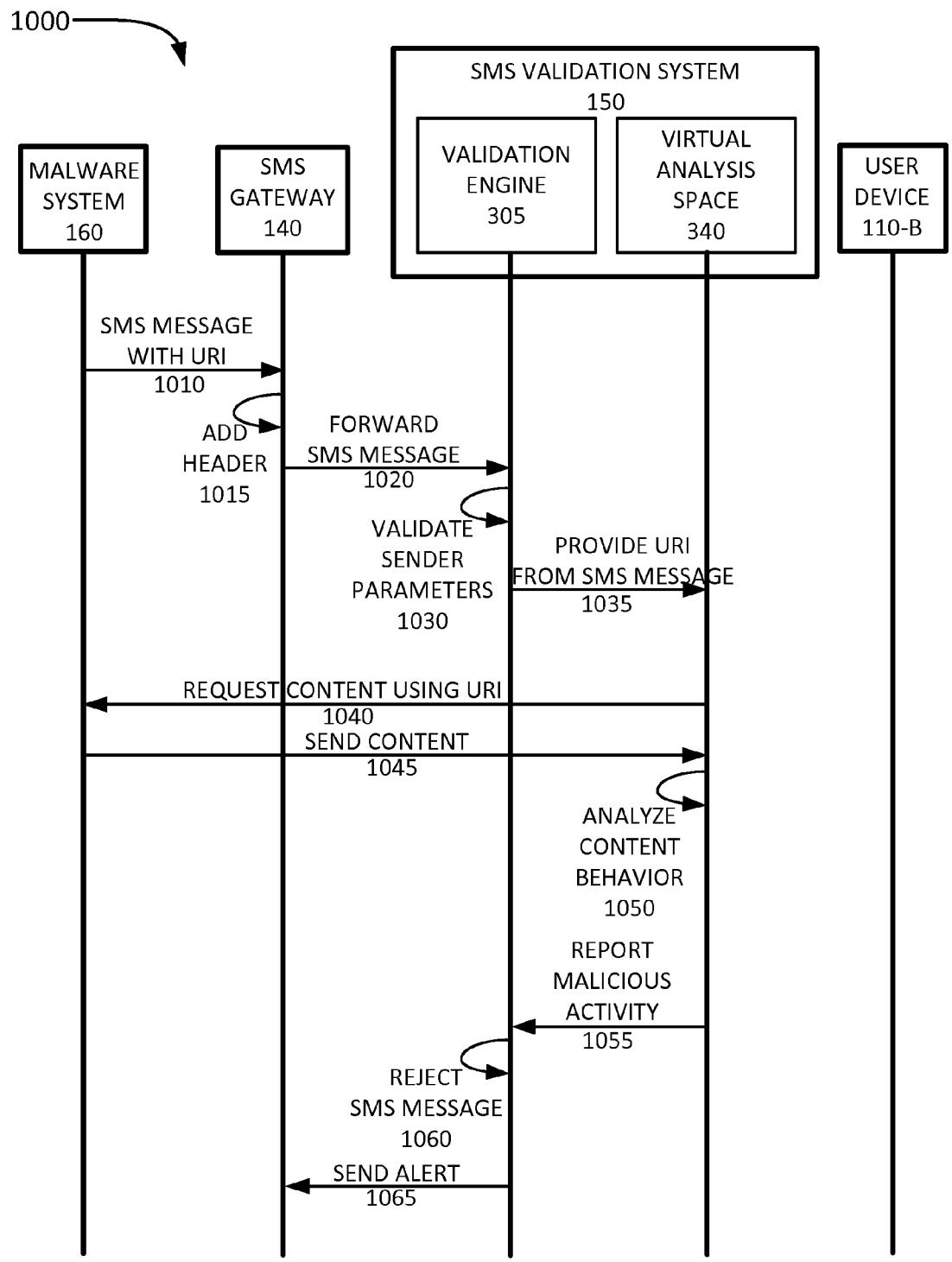
FIG. 10 is a first exemplary signal flow for sending a Short Message Service message according to an implementation described herein.

FIG. 10 is a first exemplary signal flow 1000 for sending a Short Message Service message according to an implementation described herein. Signal flow 1000 includes an example of an SMS message being rejected as a result of behavior analysis on a URI included in the SMS message. Signal flow 1000 may include malware system 160 sending an SMS message with a URI (signal 1010). SMS gateway 140 may add an SMS gateway header to the SMS message (signal 1015) and may forward the SMS message to SMS validation system 150 (signal 1020). SMS validation system 150 may validate the sender parameters (signal 1030). Assume SMS validation system 150 is able to validate the sender parameters. SMS validation system 150 may detect that the message content includes a URI and validation engine 305 may provide the URI to behavior analysis engine 330 to use in connection with virtual analysis space 340 (signal 1035). The URI may be used to request the content referenced by the URI, which may be stored in malware system 160 (signal 1040) and malware system 160 may provide the requested content to virtual analysis space 340 (signal 1045).

Behavior analysis engine 330 may simulate a particular mobile operating system in virtual analysis space 340 and may analyze the behavior of the downloaded content with respect to the particular operating system (block 1050). Behavior analysis engine 330 may detect a signature, indicative of an identified vulnerability of the particular operating system being exploited, in virtual analysis space 340 (signal 1055). As a result, the SMS message may be rejected (signal 1060). Furthermore, SMS validation system 150 may flag SMS gateway 140 as being associated with malware and may alert SMS gateway 140 that suspected malware is being routed through SMS gateway 140 (signal 1065).

Figure 11:
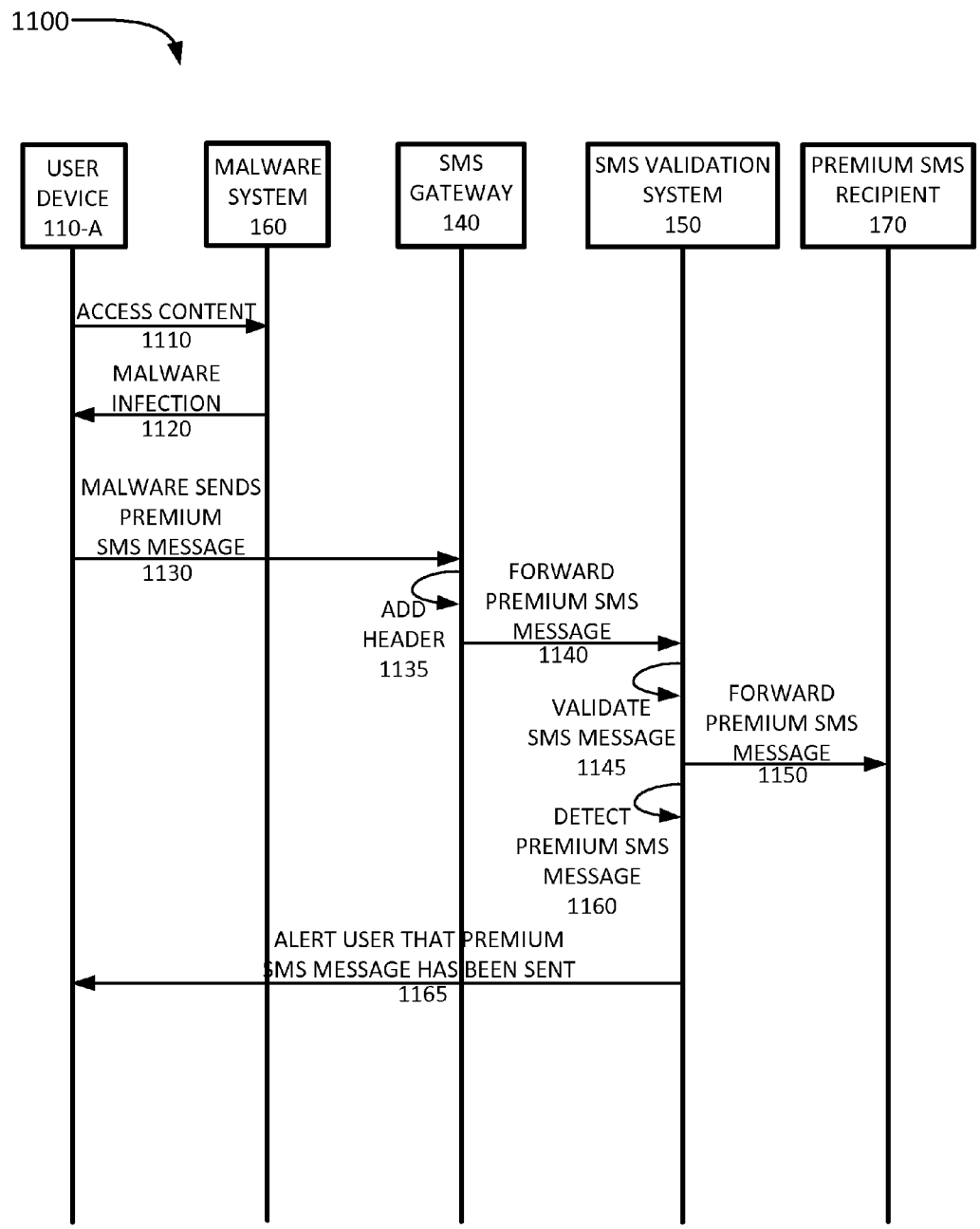
FIG. 11 is a first exemplary signal flow for sending a Short Message Service message according to an implementation described herein.

FIG. 11 is a first exemplary signal flow 1100 for sending a Short Message Service message according to an implementation described herein. Signal flow 1100 includes an example of malware causing user device 110 to send premium rate SMS messages. Signal flow 1100 may include user device 110-A accessing content (e.g., a web page) in malware system 160 (signal 1110) and becoming infected with malware (signal 1120). The malware may use user device 110-A to send SMS message to premium SMS recipient 170 via SMS gateway 140 (signal 1130). SMS gateway 140 may add an SMS gateway header to the SMS message (signal 1135) and may forward the SMS message to SMS validation system 150 (signal 1140). SMS validation system 150 may validate the SMS message (signal 1145) and may forward the SMS message to premium SMS recipient 170 (signal 1150).

Furthermore, SMS validation system 150 may detect that the recipient of the SMS message corresponds to a premium rate SMS recipient. As a result, SMS validation system 150 may alert the user of user device 110-A that a premium rate SMS message has been sent by sending an email message to the user (signal 1165). As a result, the user may become aware that unwanted SMS messages are being sent by user device 110-A.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while particular implementations have been described with respect to SMS messages, other implementations may include the processing of Multimedia Messaging Service (MMS) messages. MMS messages may include multimedia, such as images, audio files, video files. MMS messages may be processed by SMS validation system 150 or by an MMS validation system that operates analogously to, yet independently of, SMS validation system 150. Thus, sender parameters and message content of MMS message may be subject to validation. The content may be matched against a blacklist that includes multimedia content. Furthermore, MMS messages may be validated based on recipient specifications and URIs include in MMS messages may be subjected to behavior analysis. A user may select to filter multimedia content based on multimedia type. For example, a user may select to block MMS messages that include pornographic content.

As another example, while series of blocks have been described with respect to FIGS. 6-8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   receiving, by the computer device, a Short Message Service message;
   analyzing, by the computer device, one or more sender parameters associated with the received Short Message Service message to validate the one or more sender parameters;
   determining, by the computer device, whether the one or more sender parameters have been validated based on the analysis;
   rejecting, by the computer device, the Short Message Service message in response to determining that the one or more sender parameters have not been validated;
   analyzing, by the computer device, message content included in the Short Message Service message to validate the message content;
   determining, by the computer device, whether the message content has been validated based on the analysis;
   rejecting, by the computer device, the Short Message Service message in response to determining that the message content has not been validated;
   retrieving, by the computer device, a Uniform Resource Identifier from the Short Message Service message;
   accessing, by the computer device, content using the Uniform Resource Identifier;
   performing, by the computer device, behavior analysis on the accessed content in a virtual analysis space;
   determining, by the computer device, whether the Uniform Resource Identifier has been validated based on the behavior analysis;
   rejecting the Short Message Service message in response to determining that Uniform Resource Identifier has not been validated; and
   forwarding, by the computer device, the Short Message Service message to a recipient, in response to validating the one or more sender parameters, in response to validating the message content, and in response to validating the Uniform Resource Identifier.

2. The method of claim 1, wherein analyzing the one or more sender parameters includes:
   determining whether a first mobile device identifier associated with the Short Message Service message matches a second mobile device identifier associated with the Short Message Service message;
   determining whether a first base station identifier associated with the Short Message Service message matches a second base station identifier associated with the first mobile device identifier;
   determining whether a packet data network gateway identifier associated with the Short Message Service message matches a second packet data network gateway identifier associated with the first mobile device identifier; or
   determining whether a first location associated with the Short Message Service message matches a second location associated with the first mobile device identifier.

3. The method of claim 1, wherein analyzing the one or more sender parameters includes:

retrieving a Short Message Service gateway identifier from the received Short Message Service message;

determining whether the Short Message Service gateway identifier has been associated with malicious Short Message Service messages; and rejecting the Short Message Service message in response to determining that the Short Message Service gateway identifier has been associated with malicious Short Message Service messages.

4. The method of claim 1, wherein analyzing the one or more sender parameters includes:

retrieving a Short Message Service gateway identifier from the received Short Message Service message;

determining that the received Short Message Service message has been rejected; and flagging the Short Message Service gateway identifier as being associated with malicious Short Message Service messages, in response to determining that the received Short Message Service message has been rejected.

5. The method of claim 1, wherein analyzing message content included in the Short Message Service message to validate the message content includes:

determining whether the message content includes content included on a blacklist; and invalidating the message content in response to determining that the message content includes content included on the blacklist.

6. The method of claim 1, wherein the content included on the blacklist includes at least one of a term or a phrase, a Uniform Resource Identifier, or a sender identifier.

7. The method of claim 1, wherein performing behavior analysis on the accessed content in a virtual analysis space includes:

simulating an operating system in the virtual analysis space; and analyzing the simulated operating system to determine whether the accessed content exhibits malicious behavior with respect to the operating system.

8. The method of claim 1, wherein performing behavior analysis on the accessed content in a virtual analysis space includes:

simulating an application in the virtual analysis space; and analyzing the simulated application to determine whether the accessed content exhibits malicious behavior with respect to the application.

9. The method of claim 1, further comprising:

identifying a recipient associated with the received Short Message Service message;

obtaining one or more specifications associated with the identified recipient;

determining whether the Short Message Service message satisfies the obtained one or more specifications; and rejecting the Short Message Service message in response to determining that the Short Message Service message does not satisfy the obtained one or more specifications.

10. The method of claim 1, further comprising:

determining that the received Short Message Service message is associated with a premium rate recipient; and sending an alert to a sender associated with the received Short Message Service message, in response to determining that the received Short Message Service message is associated with a premium rate recipient.

11. A computer device comprising:

a memory to store instructions; and a processor configured to execute the instructions to:

receive a Short Message Service message;

analyze one or more sender parameters associated with the received Short Message Service message to validate the one or more sender parameters;

determine whether the one or more sender parameters have been validated based on the analysis;

reject the Short Message Service message in response to determining that the one or more sender parameters have not been validated;

analyze message content included in the Short Message Service message to validate the message content;

determine whether the message content has been validated based on the analysis;

reject the Short Message Service message in response to determining that the message content has not been validated;

retrieve a Uniform Resource Identifier from the Short Message Service message;

access content using the Uniform Resource Identifier;

perform behavior analysis on the accessed content in a virtual analysis space;

determine whether the Uniform Resource Identifier has been validated based on the behavior analysis;

reject the Short Message Service message in response to determining that Uniform Resource Identifier has not been validated; and forward the Short Message Service message to a recipient, in response to validating the one or more sender parameters, in response to validating the message content, and in response to validating the Uniform Resource Identifier.

12. The computer device of claim 11, wherein, when the processor is configured to analyze the one or more sender parameters, the processor is further configured to:

determine whether a first mobile device identifier associated with the Short Message Service message matches a second mobile device identifier associated with the Short Message Service message;

determine whether a first base station identifier associated with the Short Message Service message matches a second base station identifier associated with the first mobile device identifier; or determine whether a first location associated with the Short Message Service message matches a second location associated with the first mobile device identifier.

13. The computer device of claim 11, wherein, when the processor is configured to analyze the one or more sender parameters, the processor is further configured to:

retrieve a Short Message Service gateway identifier from the received Short Message Service message;

determine whether the Short Message Service gateway identifier has been associated with malicious Short Message Service messages; and reject the Short Message Service message in response to determining that the Short Message Service gateway identifier has been associated with malicious Short Message Service messages.

14. The computer device of claim 11, wherein when the processor is configured to perform the behavior analysis on the accessed content in a virtual analysis space, the processor is further configured to:

simulate at least one of an operating system or an application in the virtual analysis space; and analyze the simulated at least one of an operating system or an application to determine whether the accessed content exhibits malicious behavior with respect to the operating system.

15. The computer device of claim 11, wherein the processor is further configured to:
- identify a recipient associated with the received Short Message Service message;
- obtain one or more specifications associated with the identified recipient;
- determine whether the Short Message Service message satisfies the obtained one or more specifications; and
- reject the Short Message Service message in response to determining that the Short Message Service message does not satisfy the obtained one or more specifications.

16. The computer device of claim 11, wherein the processor is further configured to:
- determine that the received Short Message Service message is associated with a premium rate recipient; and
- send an alert to a sender associated with the received Short Message Service message, in response to determining that the received Short Message Service message is associated with a premium rate recipient.

17. A non-transitory computer-readable medium, storing instructions executable by one or more processors, the non-transitory computer-readable medium comprising:
- one or more instructions to receive a Short Message Service message;
- one or more instructions to analyze one or more sender parameters associated with the received Short Message Service message to validate the one or more sender parameters;
- one or more instructions to determine whether the one or more sender parameters have been validated based on the analysis;
- one or more instructions to reject the Short Message Service message in response to determining that the one or more sender parameters have not been validated;
- one or more instructions to analyze message content included in the Short Message Service message to validate the message content;
- one or more instructions to determine whether the message content has been validated based on the analysis;
- one or more instructions to reject the Short Message Service message in response to determining that the message content has not been validated;
- one or more instructions to retrieve a Uniform Resource Identifier from the Short Message Service message;
- one or more instructions to access content using the Uniform Resource Identifier;
- one or more instructions to perform behavior analysis on the accessed content in a virtual analysis space;
- one or more instructions to determine whether the Uniform Resource Identifier has been validated based on the behavior analysis;
- one or more instructions to reject the Short Message Service message in response to determining that Uniform Resource Identifier has not been validated; and
- one or more instructions to forward the Short Message Service message to a recipient, in response to validating the one or more sender parameters, in response to validating the message content, and in response to validating the Uniform Resource Identifier.

18. The non-transitory computer-readable medium of claim 17, further comprising:
- one or more instructions to identify a recipient associated with the received Short Message Service message;
- one or more instructions to obtain one or more specifications associated with the identified recipient;
- one or more instructions to determine whether the Short Message Service message satisfies the obtained one or more specifications; and
- one or more instructions to reject the Short Message Service message in response to determining that the Short Message Service message does not satisfy the obtained one or more specifications.

* * * * *